(12) United States Patent
Winchester

(10) Patent No.: US 6,237,537 B1
(45) Date of Patent: May 29, 2001

(54) CRATE DAM

(76) Inventor: Anne M. Winchester, 2498 Westgate Ave., San Jose, CA (US) 95125

( * ) Notice: Subject to any disclaimer, the term of this patent is extended or adjusted under 35 U.S.C. 154(b) by 0 days.

(21) Appl. No.: 09/400,617

(22) Filed: Sep. 20, 1999

Related U.S. Application Data

(60) Provisional application No. 60/101,245, filed on Sep. 21, 1998.

(51) Int. Cl.⁷ .................................................. A01K 13/00
(52) U.S. Cl. ............................................................ 119/673
(58) Field of Search ................................ 119/673, 676, 119/675; 4/555, 556, 557

(56) References Cited

U.S. PATENT DOCUMENTS

| | | | |
|---|---|---|---|
| 3,485,213 | * | 12/1969 | Scanlon . |
| 4,432,104 | * | 2/1984 | Sasaki ........................................ 4/555 |
| 4,680,817 | * | 7/1987 | Sloan et al. ............................... 4/556 |
| 4,890,341 | * | 1/1990 | Forbes ........................................ 4/555 |
| 5,255,400 | * | 10/1993 | Sween ........................................ 4/556 |
| 5,711,252 | * | 1/1998 | Brandolino ............................. 119/673 |

* cited by examiner

*Primary Examiner*—Thomas Price

(57) ABSTRACT

A removable device that is used with the bottom part, or crate bottom (50), of modular dog crates having a plurality of solid walls and an additional wall with an entryway cutout (52) to create a temporary pet bathtub enclosed on all sides. The device comprises, in part, a rigid, waterproof panel (12) with an elongated transom (16) affixed to its top edge. A gasket (18) is affixed to the edges of the panel (12) which abut the entryway cutout (52) to ensure a watertight seal between the panel (12) and the perimeter lip of the entryway cutout (52). Alignment hardware (20) and fastening devices (22) are affixed to the panel (12) and transom (16) to aid in the positioning and securing in place of the device in the entryway cutout (52). One or more drain assemblies (24) pass through the face of the panel (12) to provide a means of draining the crate bottom (50) after it has been filled with water.

6 Claims, 3 Drawing Sheets

CRATE DAM

CROSS-REFERENCES TO RELATED APPLICATIONS

This application claims the benefit of Provisional Patent Application Ser. No. 60/101,245, filed Sep. 21, 1998.

BACKGROUND—FIELD OF INVENTION

This invention relates to pet bathtubs, specifically to a removable closure for providing a pet bathtub.

BACKGROUND—DESCRIPTION OF PRIOR ART

In the past, people seeking, to bathe their dog in a bathtub environment which allowed the dog to be immersed had few choices. One option had been to use a home bathtub designed for human use. This option generally required lifting the dog into the bathtub and then kneeling on the floor to wash the dog, which is physically and mentally taxing for both the dog and the dog owner. Additionally, the home bathtub also had the disadvantage of not being portable.

Another option to bathing the dog was to use a large tub, such as a galvanized washtub, a horse trough, etc. One problem with this method was that there was no satisfactory way to drain the tub. Thus it was very difficult to thoroughly rinse the dog while it was still confined in the tub.

Yet one more option was to use a specially designed for dogs or other pets. It may have been easier to wash the dog this way, but it required the purchase of a relatively expensive and bulky new piece of equipment that, in many cases, wasn't portable.

In addition, many of the stand-alone pet bathtubs, as shown in U.S. Pat. No. 5,794,570 to Foster et. al., Aug. 18, 1998 have an open end to allow the dog to walk in, but there has been no way of closing off the entryway to allow immersion of the dog. Various bathtubs for designed for human use, as shown in U.S. Pat. No. 5,184,358 to Graidel et al., Feb. 9, 1993 and stand-alone pet bathtubs, as shown in U.S. Pat. No. 5,845,604 to Cucchi et. al., Dec. 8, 1998 have been developed that have entryway cutouts in one wall that can be sealed with removable closures. However, these entryway closures function with the particular bath of which they are a part, requiring the purchase of an often expensive and bulky new piece of equipment.

Various watertight removable entryway closures have been developed for other purposes, as shown in U.S. Pat No. 5,077,945 to Koeniger, Jan. 2, 1992, but these cannot be used to create any sort of a pet bathtub.

SUMMARY

A pet bathtub conversion device according to the present invention is a device to be used in combination with the bottom part of a modular dog crate having a plurality of solid walls and an additional wall with an entryway cutout to temporarily create a dog bathtub enclosed on all sides. The conversion device thus converts a dog crate to a pet bathtub. It comprises a waterproof panel, gasket, one or more drain assemblies passing through the face of the panel, and a plurality of alignment hardware and fastening devices.

OBJECTS AND ADVANTAGES

Several objects and advantages of the present invention are:

a) to provide an entirely new solution to the problem of bathing a dog in a portable bathtub environment;

b) to provide an inexpensive, lightweight, easy-to-store device to temporarily convert the bottom part (or crate bottom) of a disassembled modular dog crate having a plurality of solid walls and an additional wall with an entryway cutout into a watertight dog bathtub enclosed on all sides;

c) to provide a way of draining the bathtub thus created to a level near the bottom of the crate bottom floor using a siphoning drain assembly;

d) to provide a bathtub with a removable entryway closure allowing for the entrance and exit of the dog; and e) to provide a device that can be easily installed and removed without the use of tools or without requiring any permanent alterations to the crate bottom itself.

The pet bathtub conversion device for dog crates of the present invention, when used in combination with the crate bottom, has many advantages over conventional human and animal bathtubs that are currently available. Some of the advantages are:

a) it is lightweight, easy and inexpensive to manufacture, takes up little space in comparison to a stand-alone pet bath, and is very portable;

b) the bathtub created can be easily drained;

c) the conversion device can be removed to provide a walk-in entryway for the dog so that no lifting of the dog is required;

d) the conversion device is removable without the use of tools and does not require any permanent alterations to the crate itself so that the crate bottom can be used as part of an assembled modular dog crate when not being used in combination with the conversion device to form a pet bathtub;

e) the conversion device can be secured in position on the crate bottom to provide a bathtub enclosed on all sides for more or less complete immersion of the dog and to provide a physical as well as psychological barrier to the escape of the dog;

f) the conversion device is used with a product (the crate bottom) that many dog owners already have, so that it does not require the purchase of a separate stand-alone dog bath.

Further objects and advantages of my invention will become apparent from a consideration of my drawings and ensuing descriptions.

DRAWING FIGURES

REFERENCE NUMERALS

10 Pet Bathtub Conversion Device for Dog Crates
12 Panel

14 Hole
16 Transom
18 Gasket
20 Alignment Hardware
22 Fastening Devices
24 Drain Assembly
26 Hollow Drain Coupling
28 Interior Drain Assembly
30 Exterior Drain Assembly
32 Pipe Gasket
34 Interior Elbow Connector
36 Siphon Tube
38 Strainer
40 Exterior Elbow Connector
42 Drain Hose
44 Cap
50 Crate Bottom
52 Entryway Cutout
54 Entryway Perimeter Lip
56 Crate Floor
58 Crate Bottom Entryway Threshold
60 Complementary Crate Element
62 Top Front Edge of Crate Bottom

DESCRIPTION—FIGS. 1–5—PREFERRED EMBODIMENT

Figure 3:
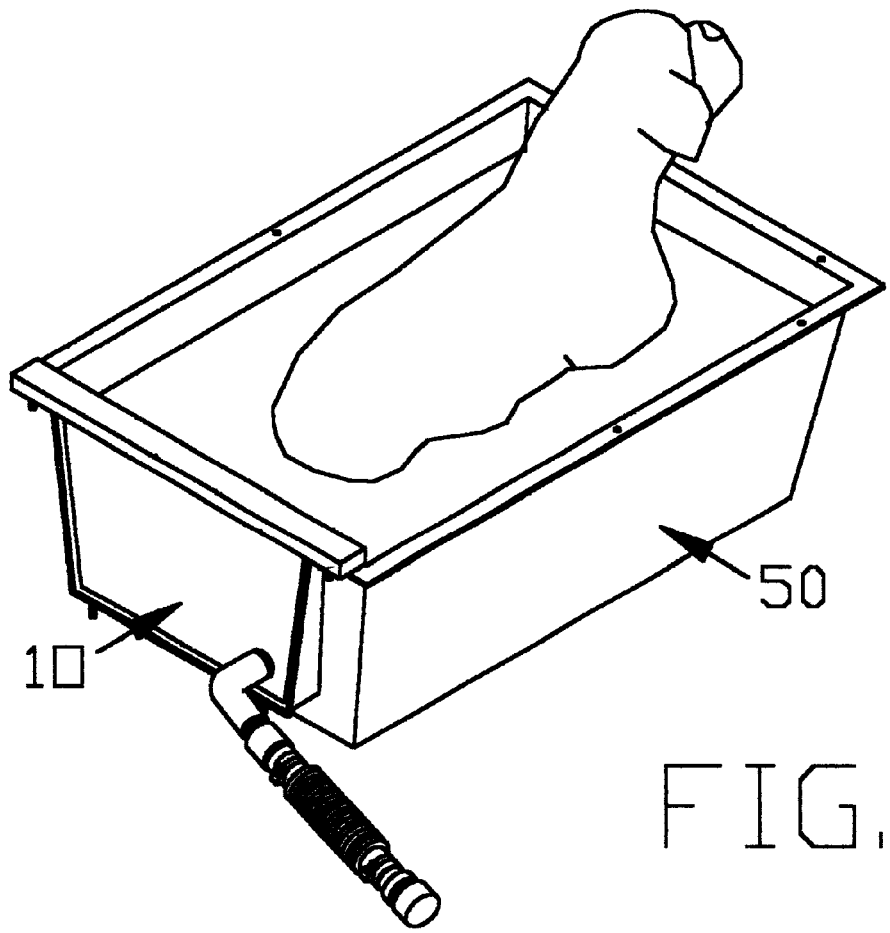
FIG. 3 shows an isometric or perspective view of the pet bathtub conversion device positioned in the crate bottom to form a dog bathtub.

As shown in FIG. 3, a pet bathtub conversion device is a removable closure that is used in combination with the bottom part (or crate bottom 50) of certain modular dog crates to temporarily create a pet bathtub enclosed on all sides. A modular dog crate is a rigid, portable kennel or pet carrier comprising a crate top and crate bottom 50 which are temporarily attached to each other to form a dog-house-like enclosure with an entryway cutout 52 (which may be fitted with a removable door) at one end, allowing for the ingress and egress of the dog. Crate bottom 50, with which the conversion device 10 is used, has a plurality of solid walls and an additional wall with an entryway cutout. It forms a container having a bottom and upstanding side walls extending up from the bottom, with one of the upstanding side walls having an entryway cutout. One example of a modular dog crate with such a crate bottom 50 is manufactured by Doskocil Mfg. Co., Inc. of Arlington, Tex. under the trademark VARI-KENNEL. The VARI-KENNEL and similar modular dog crates made by other manufacturers come in a variety of shapes and sizes with various means of attaching the crate top to crate bottom 50.

Figure 1:
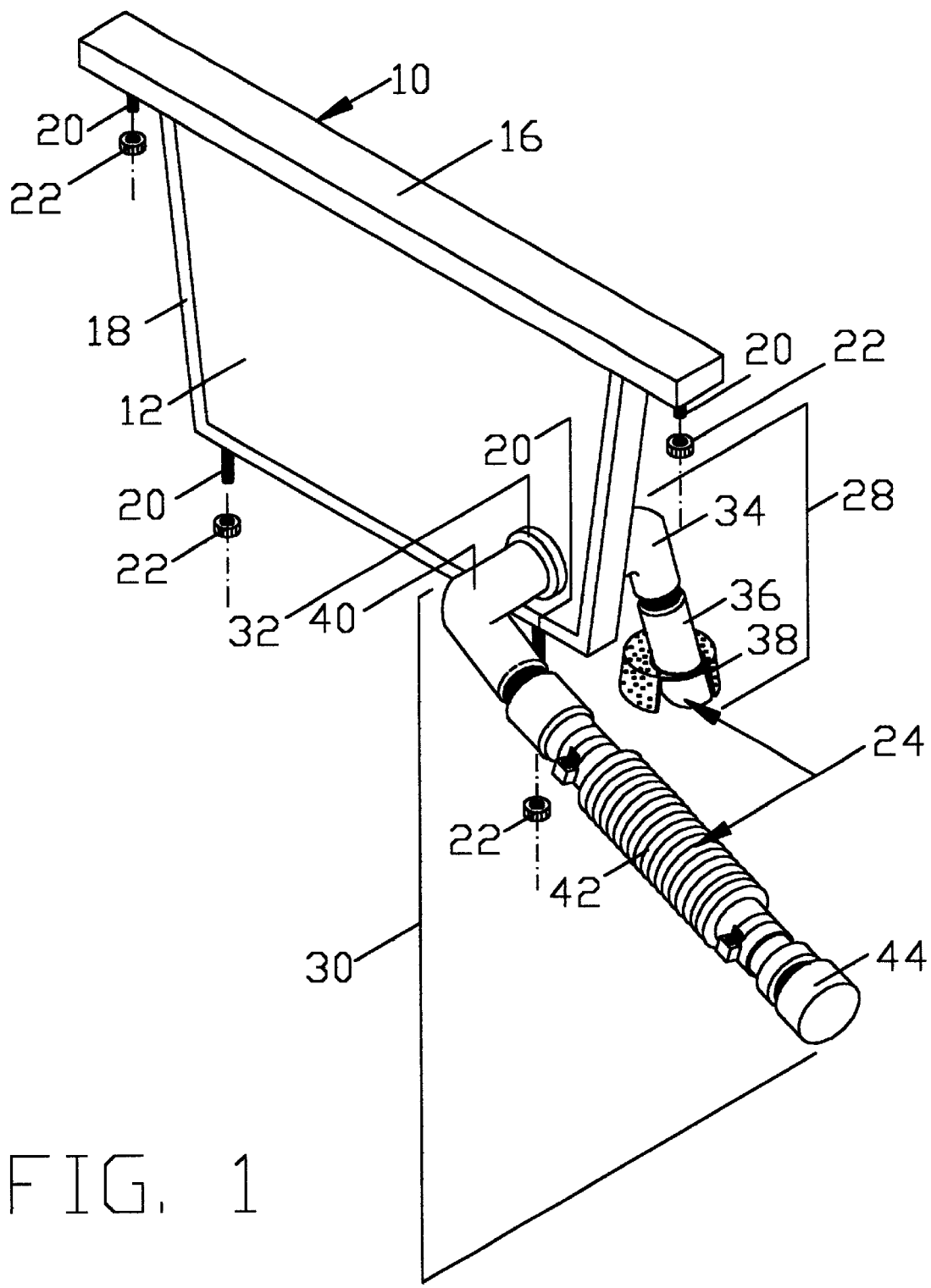
FIG. 1 is an isometric or perspective front view of a pet bathtub conversion device for dog crates according to my invention.
Figure 2:
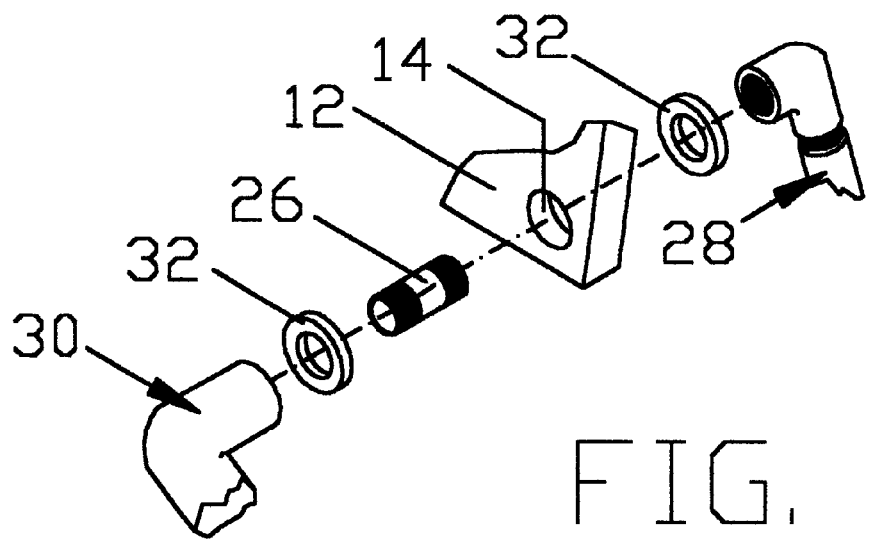
FIG. 2 shows a partial exploded view of a drain assembly used in the pet bathtub conversion device.

FIG. 1 shows a pet bathtub conversion device and FIG. 2 shows a partial exploded view of a drain assembly used in the device. The conversion device comprises a panel 12, a transom 16, gasket 18, a plurality of alignment hardware 20 and fastening devices 22, and a drain assembly 24. Drain assembly 24 comprises an interior drain assembly 28, an exterior drain assembly 30, and a hollow drain coupling 26 passing through a hole 14 running perpendicular to and through the face of panel 12.

Figure 4:
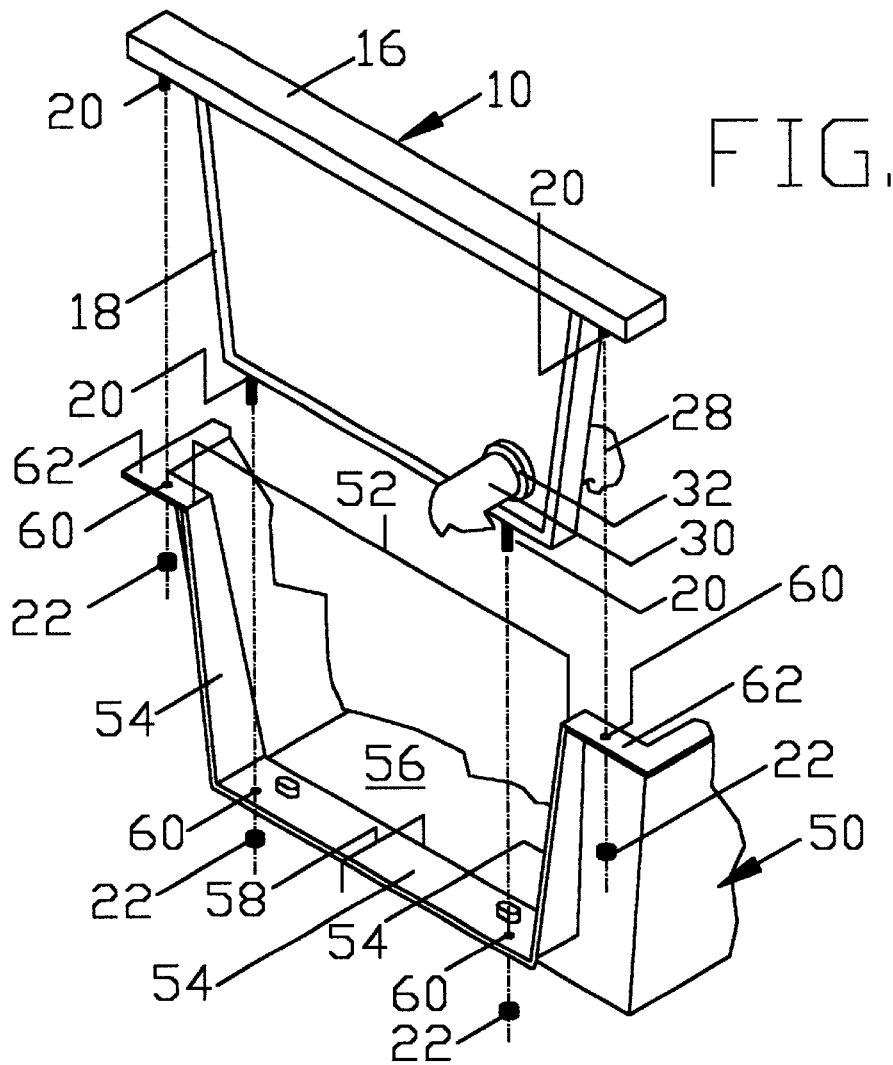
FIG. 4 is an isometric or perspective exploded front view showing the relationship between the pet bathtub conversion device and the crate bottom.

FIG. 3 shows the conversion device positioned in a crate bottom 50 to form a pet bathtub; FIG. 4 shows the relationship between the conversion device and crate bottom 50. The exact shape, size, and location of various fear of the conversion device are dependent upon the particular size and type of crate bottom 50 with which it is used. Hence, aspects of crate bottom 50 that impact features of the conversion device are noted in the description that follows. (For clarity, these modular dog crate features are numbered 50 and above).

As shown in FIG. 4, panel 12 in a front plane view approximately corresponds in shape to, but is marginally smaller in size than, the void created by an entryway cutout 52 in the wall of crate bottom 50. Panel 12 has a thickness at its edges approximately the same as the average width of the crate bottom entryway perimeter lip 54. In the preferred embodiment, panel 12 has the same thickness throughout. However, the thickness may vary in the body of panel 12 as long as the edges of panel 12 have the thickness stated.

Panel 12 has at its top edge a transom 16 extending laterally on either side and across the top front edge of the crate bottom 62. In end view, transom 16 is somewhat wider than it is tall and has a width greater than panel 12. In the preferred embodiment, panel 12 and transom 16 are made in once piece of a rigid, waterproof material such as cast or molded plastic, and may be solid or hollow in parts or throughout.

A resilient, compressible, waterproof gasket 18, such as closed cell neoprene foam, is affixed to panel 12 at its edges abutting entryway perimeter lip 54 of crate bottom 50. Gasket 18 has the same width as the edges of panel 12 to which it is affixed and is of sufficient thickness to create a watertight seal when the conversion device is secured in place in entryway cutout 52. In the preferred embodiment, gasket 18 is affixed to the edge of panel 12 by adhesives, but it may also be affixed with fastening devices, such as screws or pins, or by heat or chemical bonding during the of manufacture of panel 12.

As shown in FIG. 4, alignment hardware 20 is affixed to the conversion device at points on the underside of transom 16 and at bottom edge of panel 12. Alignment hardware 20 is shaped and positioned to provide a mating fit to the complementary crate elements 60, such as voids or projections in crate bottom 50 that are adjacent to or abutting part of the conversion device when it is positioned in entryway cutout 52 of crate bottom 50. In the preferred embodiment, alignment hardware 20 comprises threaded rods; complementary crate elements 60 comprise holes passing through the entryway perimeter lip 54 and holes passing through the top front edge of the crate bottom 62; and fastening devices 22 are threaded nuts that are attached to alignment hardware 20. In the preferred embodiment, alignment hardware 20 is manufactured as an integral piece of the same material as panel 12 and transom 16. Alternatively, they may be made of a different type of rigid, waterproof material affixed to panel 12 and transom 16 using adhesives, threads, or other methods.

As shown in FIG. 2, a hole 14 runs through panel 12 perpendicular to the face of panel 12 at a location near a lower corner. Hole 14 is fitted with a hollow drain coupling 26 to which interior drain assembly 28 and exterior drain assembly 30 are attached. In the preferred embodiment, hollow drain coupling 26 is a plastic pipe nipple with a nominal diameter of 1½" (about 3.8 cm) and of sufficient length so that, when it is permanently affixed within hole 14, it has pipe threads extending outward from both the front and rear faces of panel 12 for a distance that allows the placement of a compressible waterproof pipe gasket 32 about the exposed threads on either side of panel 12 and the attachment of interior drain assembly 28 and exterior drain assembly 30 on opposite faces of panel 12.

Figure 5:
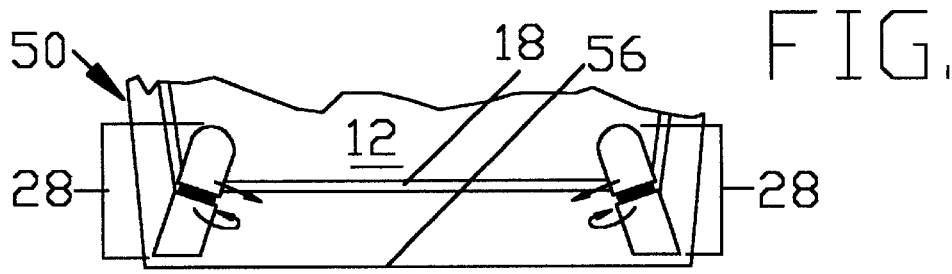
FIG. 5 is an orthographic rear view showing the position and orientation of interior drain assemblies used in the pet bathtub conversion device.

As shown in FIG. 1 interior drain assembly 28 comprises an interior elbow connector 34 attached by threads at one end to a siphon tube 36 and at the other end to the exposed threads of hollow drain coupling 26 at the back face of panel 12 (shown in FIG. 2). As shown in FIG. 4, interior elbow connector 34 extends outward horizontally from the rear face of panel 12 to a point past the crate bottom entryway threshold 58 before bending downward toward the crate floor 56. As shown in FIG. 1 and FIG. 5, interior drain assembly 28 is positioned so that its terminus is directed towards the adjacent front corner of crate bottom 50.

As shown in FIG. 5, the terminus of interior drain assembly 28 is cut to length at a slight angle so that when the conversion device is positioned in entryway cutout 52, the terminus of interior drain assembly 28 is parallel to and slightly above the level of crate floor 56. Interior drain assembly 28 is rotatable about its parts so that it can be placed in optimal alignment to crate floor 56 at either front corner of crate bottom 50.

As shown in FIG. 1, siphon tube 36 is fitted with a stainer 38 at its lower end. Strainer 38 has the approximate shape of a bottomless hollow cylinder that is wider than it is tall. The shape of strainer 38 may be modified so that it will fit snugly against the corner walls of crate bottom 50 when the conversion device is positioned in crate bottom 50. Additionally, a portion of the side wall of strainer 38 may be removed where it abuts the corner walls. The exact size of strainer 38 is not critical, but it will have approximately twice the diameter of siphon tube 36. Strainer 38 has a top surface pierced with a hole though which siphon tube 36 passes to provide a tight fit. In the preferred embodiment, strainer 38 is held in place by friction. The sides and top of strainer 38 are pierced to allow the flow of water, yet prevent debris, such as dog hair, from entering the mouth of siphon tube 36. Strainer 38 preferably is made of a cast or molded plastic.

As shown in FIG. 1, exterior drain assembly 30 comprises a threaded exterior elbow connector 40, a drain hose 42, and a cap 44. Drain hose 42 is a collapsible hose such as that manufactured by Global Med Inc. of Trenton, Ont., Canada. The collapsible hose is convoluted so that it can be compressed and extended along its length to substantially decrease or increase the volume of air or water contained within.

Hose 42 is fitted at each end with conventional threaded hose connection pieces. Drain hose 42 is of a length so that when fully collapsed, it will extend from the its end at exterior elbow connector 40 projecting from panel 12 to a point beyond the crate floor 56 at the lower front corner of crate bottom 50 (shown in FIG. 4) where drain assemblies 24 are attached, but it will not be so long as to be unwieldy to extend and collapse repeatedly. In the preferred embodiment, the collapsible drain hose does not extend more than about 0.5 meter.

With the exception of drain hose 42 and strainer 38, the parts of the drain assemblies are made of conventional PVC or other plastic plumbing material.

OPERATION OF CONVERSION DEVICE—
FIGS. 3 AND 4

To use the conversion device in combination with crate bottom 50 to bathe a dog, as shown in FIG. 3, crate bottom 50 is placed in a convenient location, preferably on a raised surface of some height that will be comfortable for both the dog and the dog owner. In order to achieve the full benefits of the siphoning drain, crate bottom 50 is minimally elevated several centimeters from the ground to allow a portion of exterior drain assembly 30 to reach a point below crate floor 56. This is easily accomplished by placing boards, blocks, or the like under crate bottom 50. At whatever height, it is advantageous, but not absolutely necessary, to angle crate bottom 50 so that it has a tendency to drain towards the front corner of crate bottom 50 where siphon tube 36 is located.

Once the crate is set up in a convenient place, the dog is led into empty crate bottom 50.

Then, as shown in FIG. 4, the conversion device is lowered coplanarly into entryway cutout 52 so that alignment hardware 20 engage with complementary crate elements 60. The conversion device is then secured in place with fastening devices 22, so that gasket 18 is compressed against entryway perimeter lip 54 to create a watertight seal.

With a cap 44 or another closure, such as an in-line shut-off valve (not shown), providing a temporary closure to exterior drain assembly 30, the dog is bathed in the usual fashion, as shown in FIG. 3. At any point during the bath, or when the bath is completed, some or all of the water is drained from crate bottom 50.

Cap 44 is removed from drain hose 42 (or the in-line valve opened) and the water in crate bottom 50 drains to the level of the mouth of siphon tube 36 by gravity-induced siphoning action provided that 1) the starting level of water in crate bottom 50 is high enough to completely submerge interior drain assembly 28, and 2) the terminus of exterior drain assembly 30 is located at some position lower than the level of crate floor 56, and 3) no portion of exterior drain assembly 30 is located above the water level in crate bottom 50.

In the event that the staring level of water in crate bottom 50 is not above the top of interior drain assembly 28 but there are several centimeters of water above the mouth of siphon tube 36, crate bottom 50 is drained by mechanically-induced siphoning using the collapsible drain hose 42, shown in FIG. 1. With cap 44 secured to the terminus of collapsible drain hose 42, collapsible hose 42 is repeatedly extended and collapsed to force air out of and draw water into the drain assemblies. When all air has been expelled, hose 42 is extended to fill with water to a point below the level of crate floor 56 and cap 44 is removed. This starts the siphoning action and crate bottom 50 drains to the level of the mouth of siphon tube 36.

Once crate bottom 50 is drained, fastening devices 22 are removed from alignment hardware 20, and the conversion device is removed from entryway cutout 52 by grasping the edges of transom 16 overhanging panel 12 and lifting upwards. The dog is then be led out of crate bottom 50 and the minimal amount of water remaining in crate bottom 50 is easily removed with a sponge or towel.

CONCLUSIONS, RAMIFICATIONS, AND SCOPE

Thus the reader will see that my conversion device provides an inexpensive-to-manufacture, lightweight, easy-to-store, easy-to-use, removable device to create a temporary dog bathtub when used in combination with certain modular dog crate bottom pieces. The bathtub thus created provides for easy entry and exit of the dog before and after the bath while allowing confinement of both the dog and bathwater in a bathtub enclosed on all sides for the duration of the bath. Additionally, the conversion device allows draining the water from the bathtub to very near the level of the crate floor at any time during or after the bath by gravity-induced siphoning action and/or mechanically-induced siphoning action.

While the above description contains many specificities, these should not be construed as limitations of the scope of the invention but rather as an exemplification of one preferred embodiment.

As the exact dimensions and the location, shape, and type of certain features of the conversion device for dog crates are dependent upon the particular type and size of modular dog crate bottom 50 with which the conversion device is used, it should be obvious to anyone skilled in the art that these features may be different from those described in the preferred embodiment. For example:

Alignment hardware 20 and fastening devices 22 can take on various forms including, but not limited to, brackets or latches mounted on panel 12 and/or transom 16 that connect to entryway perimeter lip 54, etc., depending upon the available complementary crate elements 60. Additionally, alignment hardware 20 and fastening devices 22 can be one in the same. Just one example of this is to use pins or rods that can be aligned and mated with complementary crate elements 60 and then bent at a pivot point to lock the conversion device in position. Or one can use conventional snap devices in the form of hollow tubes with snap fittings that compress when being passed through a hole in the crate and pop out after having cleared the material of the crate so as to the conversion device in place. These are just a few examples of how alignment hardware 20 and fastening devices 22 can differ from those described in the preferred embodiment.

Similarly, it should be obvious to anyone skilled in the art that drain assemblies 24 may vary considerably from the preferred embodiment For example:

Interior drain assembly 28 and exterior drain assembly 30 can connect directly to one another though hole 14 in the face of panel 12, rather than attaching to hollow drain coupling 26.

Interior drain assembly 28 and exterior drain assembly 30 can be fixed, integral features of panel 12, rather than removable assemblies as long as they are positioned more or less as described in the preferred embodiment so as to effect a gravity-induced siphoning drain action.

The specified diameters of interior drain assembly 28, hollow drain coupling 26, and exterior drain assembly 30 can vary from those in the preferred embodiment.

There can be a plurality of holes 14 with hollow drain couplings 26 passing through the face of panel 12 through which exterior drain assembly 30 and interior drain assembly 28 can connect, with the additional hollow drain couplings 26 being plugged, capped, or fitted with additional drain assemblies 24.

Hollow drain coupling 26 at the face of the panel can be fitted with various types of hoses, reducing bushings, couplings, shut-off values, in-line valves, siphoning devices, pumps, etc. For example, a drain hose 42 other than the collapsible hose described in the preferred embodiment can be used and a gravity-induced siphoning of water from crate bottom 50 can be achieved simply by filling crate bottom 50 with water to a level above the top of interior drain assembly 28 before commencing to drain crate bottom 50.

While threads are used to attach certain parts to one another in the preferred embodiment, parts can be attached with cam lock or snap fit devices or other mechanisms.

Instead of using a shut-off valve or cap 44 to control the flow of water from crate bottom 50, a portion of exterior drain assembly 30 can be temporarily positioned above the level of water in crate bottom 50 to prevent the drawing of the water and lowered to a position below the level of crate floor 56 to commence the draining of the water.

These are just a few of the possible ramifications of the present invention. Accordingly, the scope of the invention should be determined not by the embodiments illustrated, but by the appended claims and their legal equivalents.

What is claimed is:

1. A device for converting the bottom part of a modular dog crate having a plurality of solid walls and an additional wall with an entryway cutout into a pet bathtub, comprising:
    a waterproof panel for providing a watertight closure to said entryway cutout,
    a transom connected to the top edge of said waterproof panel for lifting said waterproof panel from said entryway cutout and for supporting alignment hardware and a plurality of fastening devices,
    a gasket affixed to said waterproof panel at its edges abutting the entryway perimeter lip of said entryway cutout when said panel is positioned in said entryway cutout as a means of providing a watertight seal between said waterproof panel and said entryway perimeter lip,
    alignment hardware affixed to said waterproof panel and said transom for properly aligning said waterproof panel and said transom with said crate bottom and said entryway cutout,
    a plurality of fastening devices affixed to said waterproof panel and said transom for releasbly securing said waterproof panel in place in said entryway cutout and for compressing said gasket against said entryway perimeter lip to create a watertight seal, and
    one or more drain assemblies passing through a face of said waterproof panel for draining water from said crate bottom when said crate bottom is used as a pet bathtub.

2. The device of claim 1 wherein said alignment hardware is shaped and arranged to secure said waterproof panel in place in said entryway cutout and to compress said gasket against said entryway perimeter lip to create a watertight seal.

3. The device of claim 1 wherein said fastening devices are shaped and arranged to align said waterproof panel and said transom to said crate bottom and said entryway cutout.

4. A pet bathing device comprising:
    a container having a bottom and upstanding side walls extending up from said bottom, one of said walls having a cutout to allow easy pet ingress and egress,
    a panel sized and shaped to fit within and seal said cutout so that when inplace it forms in cooperation with the rest of said side walls and said bottom, a watertight, water holding container, and when removed a pet can have easy ingress and egress to and from said container,
    a gasket affixed to said panel at its edges abutting said entryway cutout when said panel is placed within said entry cutout,
    alignment hardware affixed to said panel to provide a mating fit to complementary features of said crate bottom so as to position said panel correctly within said entryway cutout,
    a plurality of fasteners devices affixed to said panel to releasably secure said panel to said crate bottom within said entryway cutout, and one or more drain assemblies passing through face of said panel.

5. A device for bating a dog or other pet, comprising:
    a bottom part of a modular dog crate having a plurality of solid walls and an additional wall with an entryway cutout edged with a perimeter lip, and
    a waterproof panel which fits within said entryway cutout of said modular dog crate, and further including,
    a transom connected to the top edge of said waterproof panel, said transom extending vertically above said waterproof panel and horizontally along the top edge of said bottom part of said modular dog crate adjacent to said entryway cutout when said panel is positioned in said entryway cutout.

6. A device for bating a dog or other pet, comprising:

a bottom part of a modular dog crate having a plurality of solid walls and an additional wall with an entryway cutout edged with a perimeter lip, and a waterproof panel which fits within said entryway cutout of said modular dog crate, and further including, one or more drain assemblies passing through a face of said waterproof panel, said drain assemblies extend from a point near the floor of said bottom part of said modular dog crate through a face of said waterproof panel and outward to a point that may be positioned below the level of the crate floor when said waterproof panel is secured in place in said entryway cutout.

* * * * *